US009153965B2

(12) United States Patent
Deshpande et al.

(10) Patent No.: US 9,153,965 B2
(45) Date of Patent: Oct. 6, 2015

(54) SYSTEM AND METHOD FOR ENERGY STORAGE MANAGEMENT (75) Inventors: Sachin G. Deshpande, Camas, WA (US); Louis Joseph Kerofsky, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 614 days.

(21) Appl. No.: 13/447,040

(22) Filed: Apr. 13, 2012

(65) Prior Publication Data

US 2013/0274935 A1    Oct. 17, 2013

(51) Int. Cl.
| | |
|---|---|
| *G05D 3/12* | (2006.01) |
| *G05D 9/00* | (2006.01) |
| *H02J 3/28* | (2006.01) |
| *H02J 3/38* | (2006.01) |
| *H02J 3/00* | (2006.01) |
| *H02J 3/14* | (2006.01) |
| *H02J 3/32* | (2006.01) |
| *H02J 13/00* | (2006.01) |

(52) U.S. Cl.
CPC . *H02J 3/28* (2013.01); *H02J 3/383* (2013.01); *H02J 3/14* (2013.01); *H02J 3/32* (2013.01); *H02J 13/0006* (2013.01); *H02J 2003/003* (2013.01); *H02J 2003/146* (2013.01); *Y02E 10/563* (2013.01); *Y02E 10/566* (2013.01); *Y02E 40/72* (2013.01); *Y02E 70/30* (2013.01); *Y04S 10/123* (2013.01); *Y04S 20/224* (2013.01)

(58) Field of Classification Search
CPC ......................................................... H02J 13/00
USPC ......................................................... 700/291
See application file for complete search history.

(56) References Cited

U.S. PATENT DOCUMENTS

| | | | |
|---|---|---|---|
| 6,366,889 B1* | 4/2002 | Zaloom ........................ | 705/7.37 |
| 2004/0111226 A1* | 6/2004 | Brewster et al. ................ | 702/61 |
| 2006/0200542 A1 | 9/2006 | Willig | |
| 2007/0271006 A1 | 11/2007 | Golden et al. | |
| 2008/0167756 A1* | 7/2008 | Golden et al. ................ | 700/297 |
| 2009/0077397 A1 | 3/2009 | Shnekendorf et al. | |
| 2009/0088907 A1 | 4/2009 | Lewis et al. | |

(Continued)

OTHER PUBLICATIONS

Kanchev et al. "Energy Management and Operational Planning of a Microgrid With a PV-Based Active Generator for Smart Grid Applications" from "IEEE Transactions on Industrial Electronics, vol. 58, No. 10, Oct. 2011".*

(Continued)

*Primary Examiner* — Mohammad Ali
*Assistant Examiner* — Yuhui R Pan
(74) *Attorney, Agent, or Firm* — Law Office of Gerald Maliszewski; Gerald Maliszewski (57) ABSTRACT A method is provided for efficiently managing energy consumption using stored energy. The method accepts input energy (e.g., from a power utility) and maintains a record of energy consumption. An energy consumption peak is predicted in response to analyzing the record of energy consumption, and the input energy is augmented with stored energy during the predicted energy consumption peaks. More explicitly, a peak shaving value is selected based on a fraction of the predicted energy consumption peak, and the stored energy is used when energy consumption exceeds the peak shaving value. In one aspect, after a determination is made to use stored energy, it is simply used while it is available. Otherwise, it is supplied based upon an analysis of a predicted value of the stored energy.

8 Claims, 7 Drawing Sheets

(56) References Cited

U.S. PATENT DOCUMENTS

| | | |
|---|---|---|
| 2010/0004791 A1 | 1/2010 | West et al. |
| 2011/0035073 A1* | 2/2011 | Ozog .................... 700/291 |
| 2013/0018821 A1* | 1/2013 | Shao .................... 705/412 |
| 2013/0030590 A1* | 1/2013 | Prosser .................... 700/295 |
| 2013/0060392 A1* | 3/2013 | Wang et al. .................... 700/291 |
| 2014/0039710 A1* | 2/2014 | Carter et al. .................... 700/291 |

OTHER PUBLICATIONS

Tamimi et al." Short term electric load forecasting via fuzzy neural collaboration" from "Electric Power Systems Research 56 (2000) 243-248".*

Amjady "Short-Term Hourly Load Forecasting Using Time-Series Modeling with Peak Load Estimation Capability" from "IEEE Transactions on Power Systems, vol. 16, No. 3, Aug. 2001".*

Zhou et al., COmposite energy storage system using dynamic energy management in microgrid applications, IPEC, 2010.

Hiyama et al., Neural network based estimation of maximum power generation from PV module using environmental information, IEEE Trans. on Energy Conversion, 1997.

Chen et al., Energy Prediction Based on Resident's Activity, SensorKDD'10, 2010.

Wei et al., Short-Term power load forecasting using improved ant colony clustering, WKDD, 2008.

* cited by examiner

```
//predict peak threshold
 maxload=0; sampleidx=0;
 for( i=0;i<SAMPLES_DAY;i++)
 {
    if(netloadthis[i]>maxload)
    {
                maxload=netloadthis[i];
                sampleidx=i;
             }
 } peakshavethreshold=0;
 int loopcount=(int)(maxload*1.0/LOADSTEPSIZE);

ii=maxload;

for( i=0;i<loopcount;i++)
 {
    if(ii>=0){
       for(int j=0;j<SAMPLES_DAY;j++)
        {testload[i]=0;}
       for(int j=0;j<SAMPLES_DAY;j++)
       {
          if(netloadthis[j]>=i)
          {
                testload[j]=netloadthis[j]-i;
             }
       }
    if(trapz(testload,SAMPLES_DAY)>storedenergy)
      {peakshavethreshold=i+LOADSTEPSIZE;
       break;} ii=ii-LOADSTEPSIZE;
       }
 }

EstimatedPeakToday= ALPHA*peakshavethreshold;
```

SYSTEM AND METHOD FOR ENERGY STORAGE MANAGEMENT

BACKGROUND OF THE INVENTION

1. Field of the Invention

This invention generally relates to energy management and, more particularly, to a system and method for efficiently managing peak power consumption using stored energy.

2. Description of the Related Art

The higher cost of energy is being addressed by the consumer in the form of more efficient energy consumption devices and consumption algorithms that economize. Power utilities and government agencies often attempt to address the issue by changing the consumer's usage habits. Rather than following market-based principles that might dictate that a larger consumer receive a discounted rate, policies may be based upon the assumption that it is fair to impose a proportionally greater charge to users that consume more energy. One such approach is to establish power consumption tiers, and increase the cost of power over a billing cycle as the consumer's usage advances over the tiers. Another approach often applied to commercial users is to determine energy costs based on peak power usage, and bill the user for the total amount of energy used during the billing period at the peak power rate.

Due to higher energy costs in general, and policy-driven cost algorithms, many consumers, especially commercial users, have installed energy storage devices in the local system, such as a battery. To address the above-mentioned peak usage billing, the consumer may add energy into storage at night, when overall power usage is lower and prices are cheaper. Then, this stored energy can be used in the daytime when the user's consumption demands are the greatest. Unfortunately, peak power usage cannot always be predicted. For example, the user may be a multi-residential facility, and peak power (e.g., AC power) may be associated with temperature, which is hard to predict. Further, there is a cycling cost penalty associated with the use of stored energy. The more often stored energy is cycled, the more quickly the storage device wears out. Based upon the cycling cost penalty and the unpredictability of peak usage, it is often against the user's interest to use an algorithm that simply cycles stored power on a daily basis.

Other users have energy generation equipment, such as photovoltaic (PV) or wind turbines, to augment their local systems. However, there are no known systems with an integrated approach to PV, storage, and load management.

It would be advantageous if peak power usage could be accurately predicted, so that stored energy could be efficiently used to supplement the input power supplied by a public utility.

SUMMARY OF THE INVENTION

Disclosed herein is an efficient stored energy usage approach that is applicable to commercial users, single and multi-family residences, and other building types. The approach is applicable to a system which consists of a photovoltaic (PV) system, a storage system, and a load. The approach takes as input data from one or more of the following information: present time, day of month, month of year, present PV generation, present load, present storage fullness, maximum storage fullness, maximum storage discharge rate, minimum storage discharge rate, and pricing information. After considering the information, a signal is output to manage the storage. That is, a decision is made each day to cycle or not cycle the storage. This integrated approach for storage management considers PV and load in the system by using a prediction technique to estimate net load during the day, and then estimates a peak shaving threshold which is utilized for managing the storage. The disclosed method utilizes (implicitly or explicitly) the pricing information including peak pricing. This information is used to reduce daily peak net load. The method is able to use storage only when necessary, thus prolonging the life of storage.

Accordingly, a method is provided for efficiently managing energy consumption using stored energy. The method accepts input energy (e.g., from a power utility) and maintains a record of energy consumption. An energy consumption peak is predicted in response to analyzing the record of energy consumption, and the input energy is augmented with stored energy during the predicted energy consumption peaks. More explicitly, a peak shaving value is selected based on a fraction of the predicted energy consumption peak, and the stored energy is used when energy consumption exceeds the peak shaving value. In one aspect, after a determination is made to use stored energy, it is simply used while it is available. Otherwise, it is supplied based upon an analysis of a predicted value of the stored energy.

The method may also determine an energy storage equipment cycling penalty. In one aspect, the method cross-references energy consumption to days in a billing period, and predicts a plurality of energy consumption peaks over the course of the billing period. Then, the method associates a unique peak shaving value with each energy consumption peak in the billing period, responsive to the determined energy storage equipment cycling penalty. Thus, the stored energy is selectively used over the course of a billing period.

Additional details of the above-described method and a system for efficiently managing energy consumption using stored energy are provided below.

DETAILED DESCRIPTION

As used in this application, the terms "component," "module," "system," and the like may be intended to refer to an automated computing system entity, such as hardware, firmware, a combination of hardware and software, software, software stored on a computer-readable, medium, or software in execution. For example, a component may be, but is not limited to being a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The computer devices described below typically employ a computer system with a bus or other communication mechanism for communicating information, and a processor coupled to the bus for processing information. The computer system may also include a main memory, such as a random access memory (RAM) or other dynamic storage device, coupled to the bus for storing information and instructions to be executed by processor. These memories may also be referred to as a computer-readable medium. The execution of the sequences of instructions contained in a computer-readable medium may cause a processor to perform some of the steps associated with monitoring a controlling and displaying energy consumption characteristics. Alternately, some of these functions may be performed in hardware. The practical implementation of such a computer system would be well known to one with skill in the art.

As used herein, the term "computer-readable medium" refers to any medium that participates in providing instructions to a processor for execution. Such a medium may take many forms, including but not limited to, non-volatile media, volatile media, and transmission media. Non-volatile media includes, for example, optical or magnetic disks. Volatile media includes dynamic memory. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge such as an SD card or USB dongle, a carrier wave as described hereinafter, or any other medium from which a computer can read.

Figure 1:
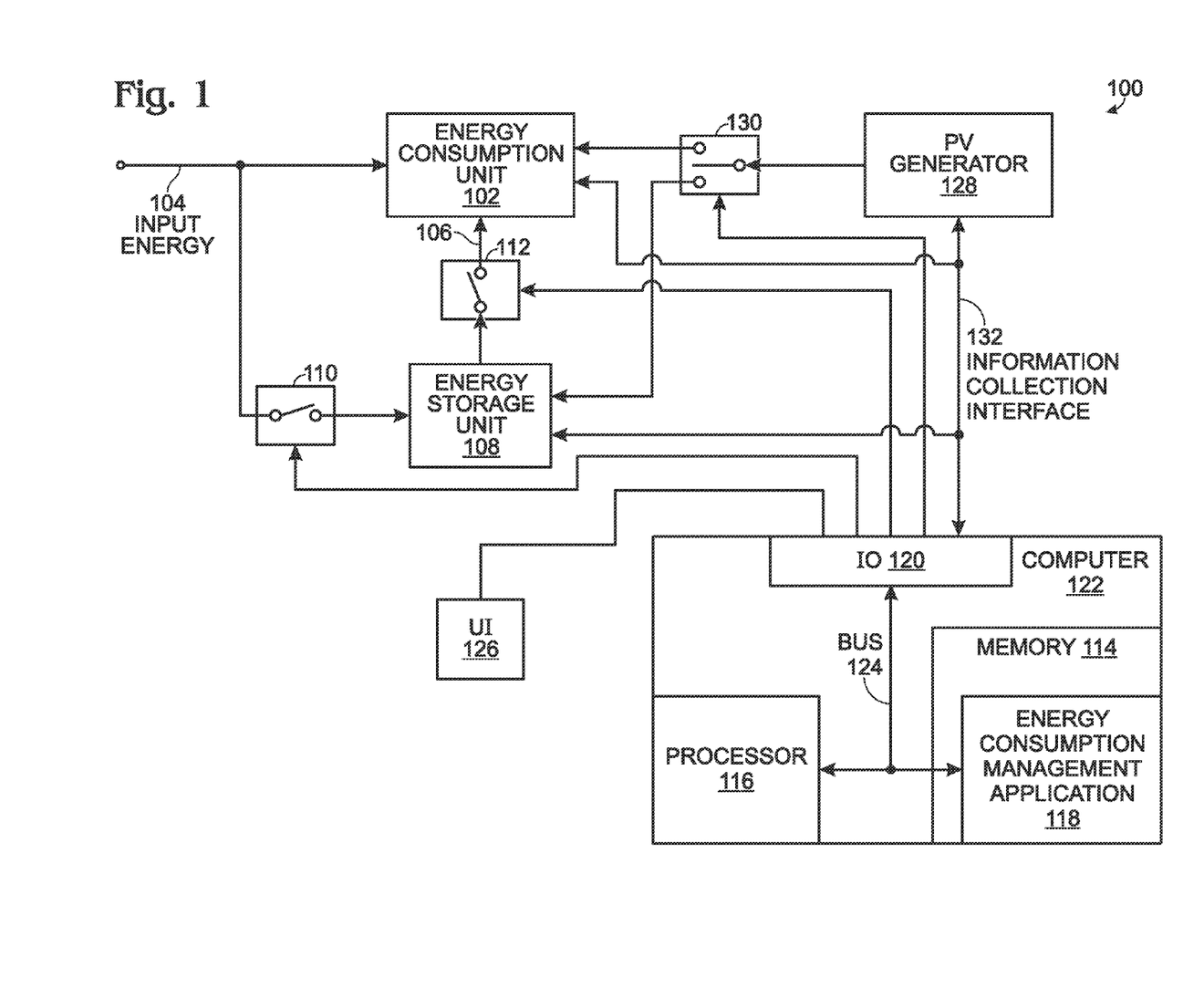
FIG. 1 is a schematic block diagram of a system for efficiently managing energy consumption using stored energy.

FIG. 1 is a schematic block diagram of a system for efficiently managing energy consumption using stored energy. The system 100 comprises an energy consumption unit 102 having an interface on line 104 to accept input energy an interface on line 106 to accept stored energy. For example, the energy consumption unit may be a single or multi-family residence with multiple electrical appliances. Alternatively, the energy consumption unit 102 may be a commercial user. The interface on line 104 may be connected to a power utility company.

An energy storage unit 108 has an interface 104 to selectively accept input energy, as represented with switch 110. The energy storage unit 108 has an interface on line 106 to selectively supply stored energy to the energy consumption unit 102, as represented by switch 112.

The system 100 further comprises a non-transitory memory 114, a processor 116, and an energy consumption management application 118, enabled as a sequence of software instructions stored in memory 114 and executed by the processor 116. The energy consumption management application 118 maintains a record of energy consumption by the energy consumption unit 102, and predicts an energy consumption peak in response to analyzing the record of energy consumption. The energy consumption management application commands the energy storage unit 108 to augment input energy to the energy consumption unit 102 with stored energy during the predicted energy consumption peaks. As shown, the energy consumption management application enables switch 112.

The energy consumption management application 118 and processor 116 use an input/output (IO) interface 120 to communicate with switches 110, 112, the energy consumption unit 102, and the energy storage unit 108. These connections may be local direct connection, or supported by a network or local area network (LAN) using a modem, an Ethernet card, or any other appropriate data communications device such as USB to communicate. The physical communication links may be optical, wired, or wireless.

As shown, the processor 116, memory 114, and energy consumption management application 118 may be enabled as 122: a personal computer (PC), Mac computer, tablet, workstation, server, PDA, handheld device, or single-function device. The processor or central processing unit (CPU) 116 may be connected to memory 114 via an interconnect bus 124. The memory 114 may include a main memory, a read only memory, and mass storage devices such as various disk drives, tape drives, etc. The main memory typically includes dynamic random access memory (DRAM) and high-speed cache memory. In operation, the main memory stores at least portions of instructions and data for execution by the processor 116. The system 100 may further include appropriate computer UI 126, such as a display, keyboard, or touchscreen.

Optionally, the system 100 may further comprise a photovoltaic (PV) energy generator 128. In another aspect not shown, a wind turbine may be used to generate energy. The energy consumption management application 118 predicts the value of the generated PV energy and determines whether the generated PV energy should be added to the stored energy or used by the energy consumption unit. Control over the flow of PV generated power is represented by switch 130.

The energy consumption management application 118 maintains the record of energy consumption by cross-referencing energy consumption to some or all of the following parameters: period of time, time of day, current consumption, day of week, season, month, weather, weather predictions, input energy costs, input energy cost changes, previous energy tier consumption, current energy generation, previous energy generation, previous peak shaving values, and combinations of the above-mentioned parameters. Other parameters may include present storage fullness, maximum storage fullness, maximum storage discharge rate, and minimum storage discharge rate. Information may be collected by the energy consumption management application 118 from the energy consumption unit 102, energy storage unit 108, and PV generator 128 via interface 132. Further, interface 132 may be connected to a network to receive information such as weather forecasts, power forecasts, and power costs.

In one aspect, the energy consumption management application 118 selects a peak shaving value based on a fraction of the predicted energy consumption peak and commands the use the stored energy when energy consumption exceeds the peak shaving value. The energy consumption management application 118 may command the use of stored energy, in a simple case, while energy is available in the energy storage unit 108. Alternatively, the stored energy is supplied in response to an analysis of a predicted value of the stored energy. In another aspect, the energy consumption management application 118 user interface 126 accepts selected parameters. The energy consumption management application 118 predicts energy consumption peaks associated with selected parameters, and associates a unique peak shaving value with each selected parameter. For example, the energy consumption management application 118 may predict an energy consumption peak associated with the selected parameter of a previous time of day. That is, the prediction may be based upon the previous day's peak.

Typically, the energy consumption unit 102 and energy storage unit 108 accept input energy on line 104 having a cost associated with a factor such as the peak value of input energy accepted, a time of day, or total energy input, to name a few examples. The energy consumption management application 118 predicts input energy costs and augments energy to the energy consumption unit 102 with stored energy in response to the input energy cost prediction.

Figure 10:
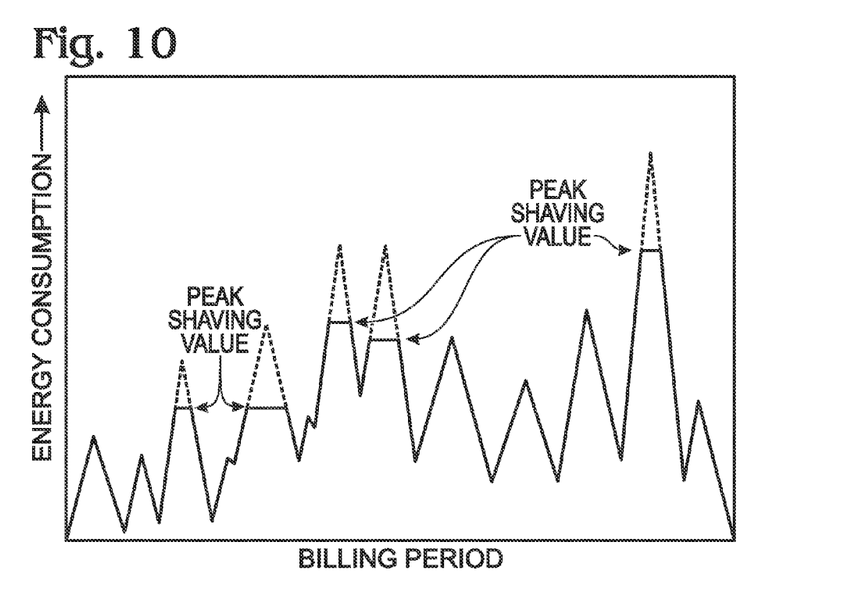
FIG. 10 is a graph depicting the selective use of stored energy over a billing period.

FIG. 10 is a graph depicting the selective use of stored energy over a billing period. Considering both FIGS. 1 and 10, the energy consumption management application 118 may determine an energy storage unit equipment cycling penalty, and maintain a record of energy consumption that cross-references energy consumption to days in a billing period. Then, the energy consumption management application predicts a plurality of energy consumption peaks over the course of the billing period, and associates a unique peak shaving value with each energy consumption peak in the billing period, responsive to the determined energy storage unit equipment cycling penalty.

Functional Description

Figure 2:
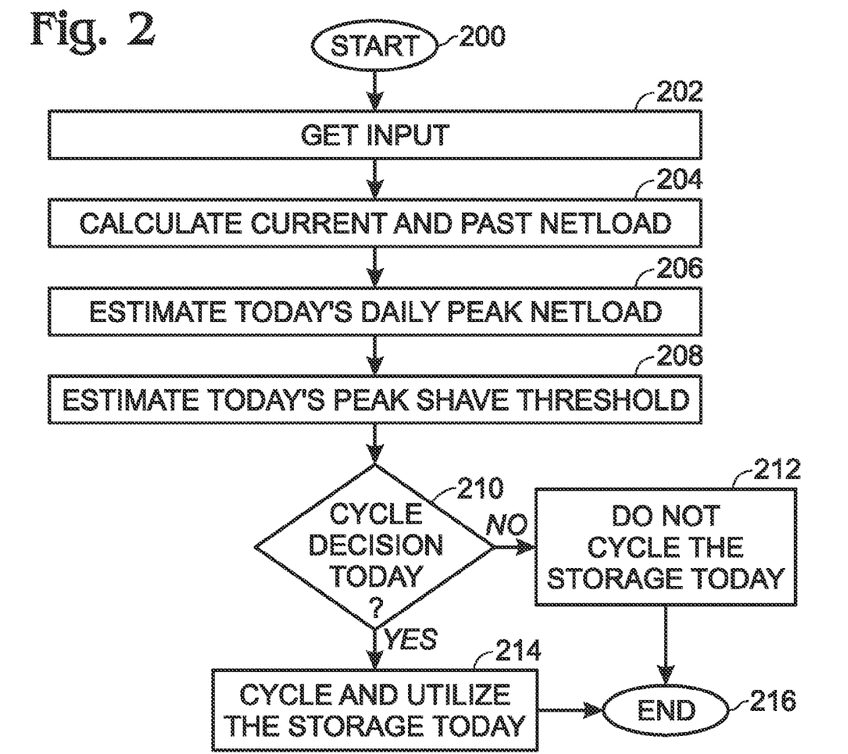
FIG. 2 is a flowchart depicting an exemplary high-level algorithm for efficient energy storage management.

FIG. 2 is a flowchart depicting an exemplary high-level algorithm for efficient energy storage management. The flowchart begins at Step 200. Step 202 takes as input data the current and past PV output, current and past load data, storage size, available storage energy, storage charge/discharge limits, today's time, day, and month information. Step 204 calculates the current and past netload. As used herein, the net load (netload) is the difference between the energy used by a customer and the energy generated locally, i.e. PV. This is the energy that a consumer must obtain from the utility. The net load is what the utility sees and what the consumer is billed, so it drives the algorithm. In the absence of local generation, the net load is equal to the energy consumption. Step 206 estimates today's peak load. Step 208 estimates today's peak shave threshold. In Step 210 a decision is made to cycle the stored energy. If the decision is "no", the flowchart goes to Step 212. Otherwise in Step 214 the stored energy is used.

Figure 3:
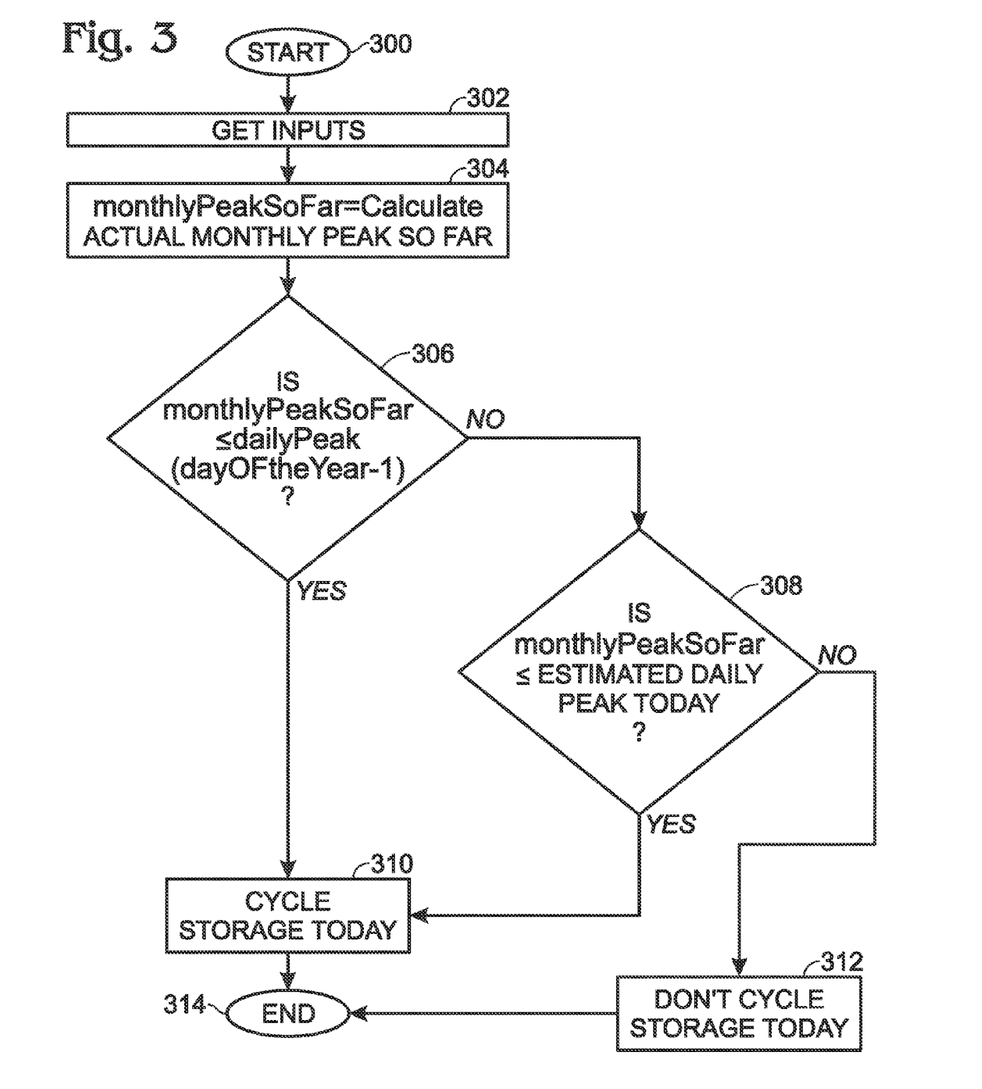
FIG. 3 is a flowchart depicting an exemplary storage cycling decision.

FIG. 3 is a flowchart depicting an exemplary storage cycling decision. This component may operate each day of the year. For each day of the year, a decision is made to either cycle the storage for that day or not cycle the storage for that day. The decision is based on the goal of reducing the monthly peak. This is because the monthly peak carries an additional charge.

The flowchart begins at Step 300. In Step 302 the energy consumption management application takes as input data information such as the day of the month, month of the year, and information for today. Also it may takes as input the actual observed daily peak history for all previous days of the month (and year). Additionally, it may use an estimate of the daily peak today. This may be obtained using pseudo-code described in FIG. 4. Using the above input information, Step 304 calculates the "monthly peak load observed so far" in the billing period. Step 306 compares the "monthly-observed peak load so far" with input data information such as the daily peak from yesterday. Step 308 compares the "monthly-observed peak load so far" with the estimated daily peak today to decide to cycle or not cycle the storage. In another aspect, weather forecast information for the month may be used to arrive at the monthly peak estimate and a decision to cycle or not cycle the storage.

Figure 4:
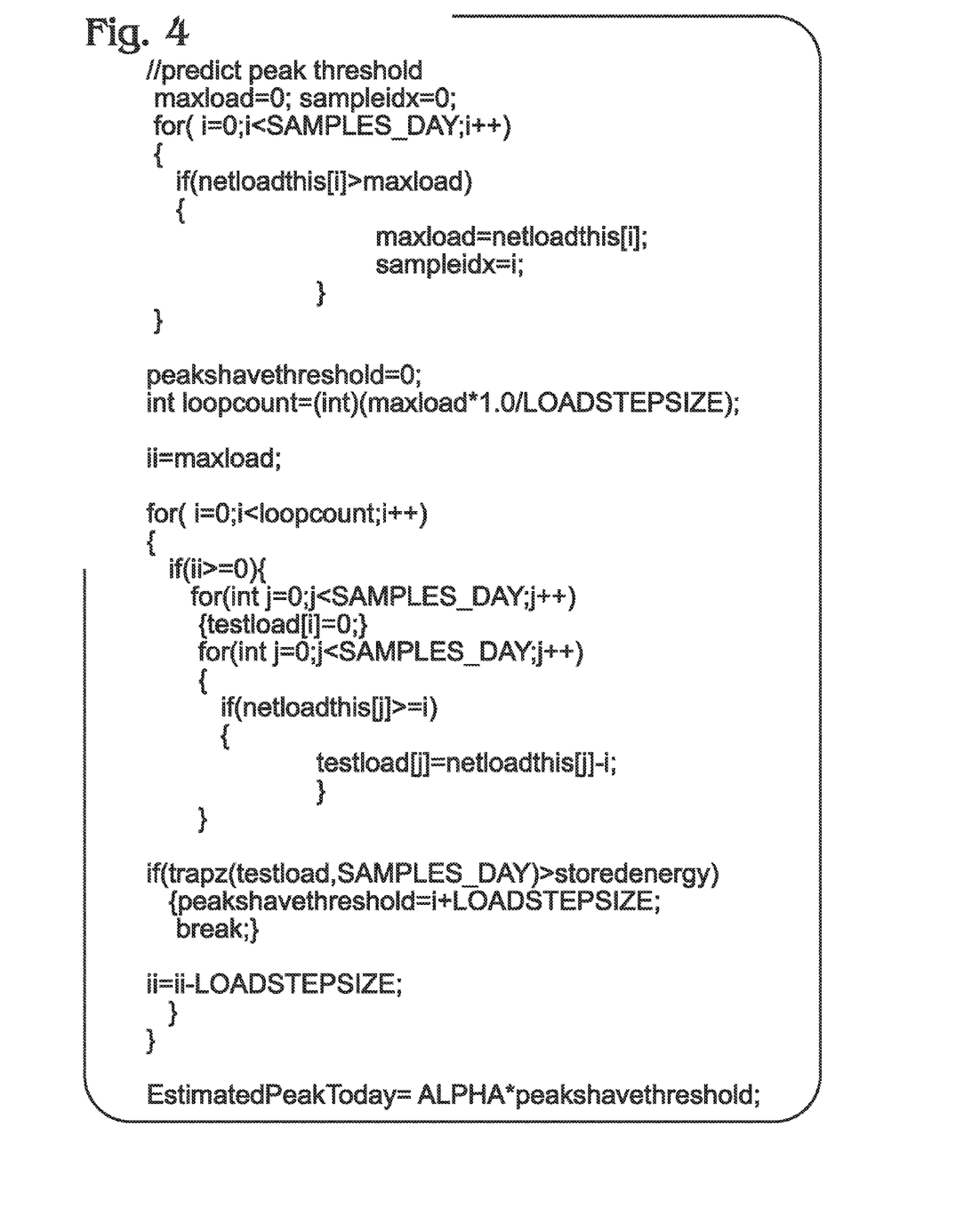
FIG. 4 shows exemplary pseudo-code for estimating the daily peak.

FIG. 4 shows exemplary pseudo-code for estimating the daily peak. This estimated value of the peak for today is utilized by the storage cycling decision to decide to cycle or not cycle the storage today. The pseudo-code first estimates the peak shave threshold by finding the optimal area under the netload curve (from past history of netload data) corresponding to stored energy. The daily peak estimate is then derived from the peak shave threshold.

Figure 5:
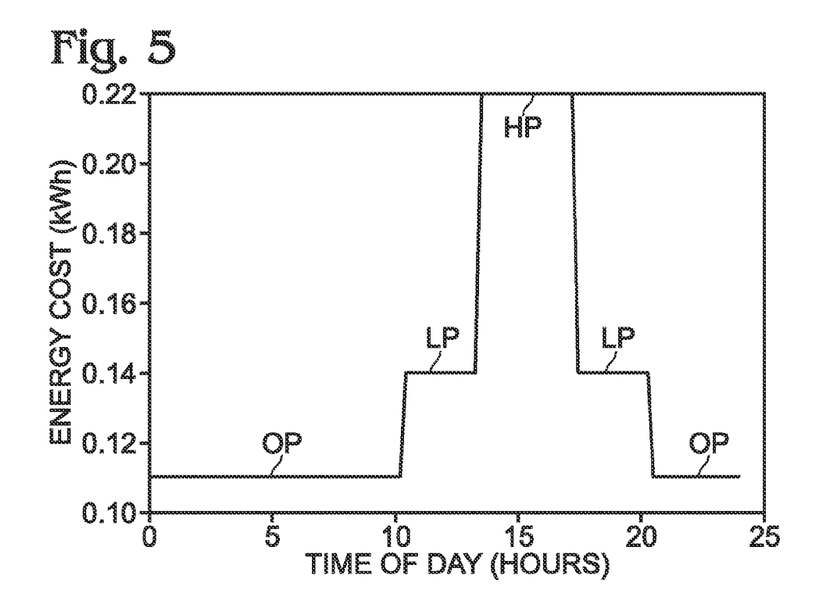
FIG. 5 is a graph depicting an example of time-of-use pricing towards which the disclosed energy consumption management system is applicable.

FIG. 5 is a graph depicting an example of time-of-use pricing towards which the disclosed energy consumption management system is applicable. As shown, the energy costs vary according to the time of day. Additionally, a daily and/or monthly peak charge is applied. OP stands for off peak, LP for low peak, and HP for high peak.

Figure 6:
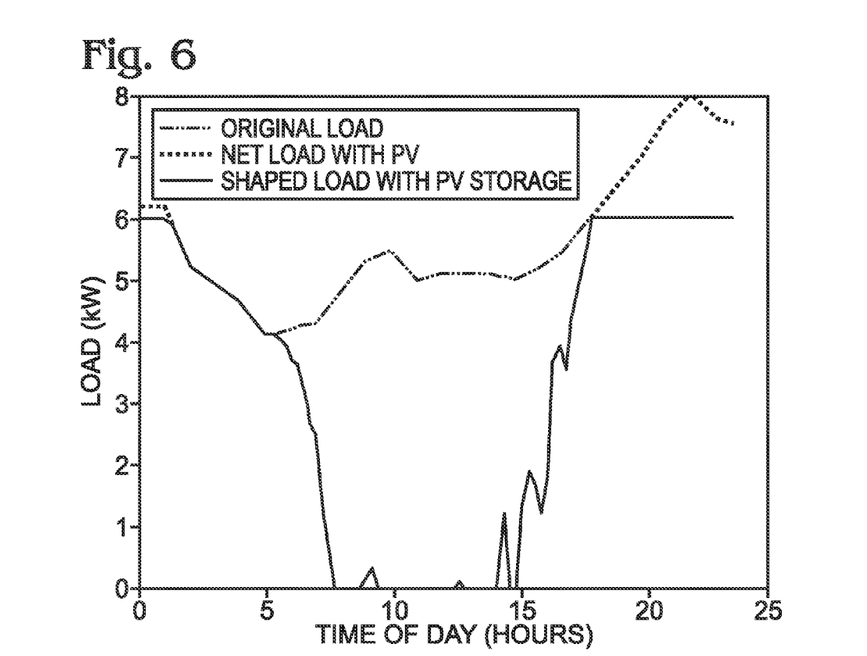
FIG. 6 is a graph comparing an original load, net load with PV, and a load shaped with PV and storage using the disclosed storage cycling algorithm.

FIG. 6 is a graph comparing an original load, net load with PV, and a load shaped with PV and storage using the disclosed storage cycling algorithm. Typically, there is no PV generation in early morning, 0-5 hours, and in the evening, 18-24 hours. The "net load with PV" is the result of subtracting the local PV generation from the "original load". Since the PV generation is zero from 0-5 hours and 18-24 hours, the two curves "net load with PV" and "original load" are the same in this plot, the original load is overwritten by the net load in these ranges. Similarly, the "shaped load with PV and storage" agrees with the "net load with PV" except in the range of 16-24 hours.

Figure 7:
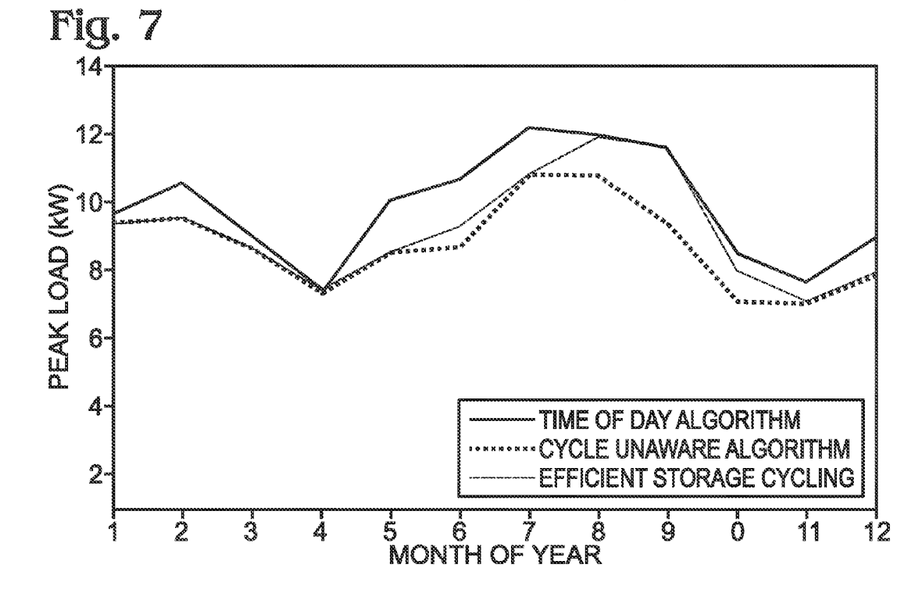
FIG. 7 is a graph depicting an exemplary monthly peak obtained using the disclosed storage cycling algorithm.

FIG. 7 is a graph depicting an exemplary monthly peak obtained using the disclosed storage cycling algorithm. Comparisons are made to a "cycle unaware" algorithm and a simple "time-of-day" algorithm. A "cycle unaware" system does not account for the cycling cost of using a storage element that can discharge at any time during the day, when the economics justify it. Basically, such a system would charge every night then discharge as appropriate during the day. One example strategy is to buy energy at a low price (i.e. at night), and use storage to offset energy use during times of peak usage. A "time-of-day" system is even simpler. The charging and discharging is governed solely by the time of day. This system ignores the cost of cycling. For example, the system may charge from 9 PM to 4 AM, and discharge from 4 PM to 6 PM. The times would be selected based on time of use rates to effectively buy at a low price and use during a high price.

Figure 8:
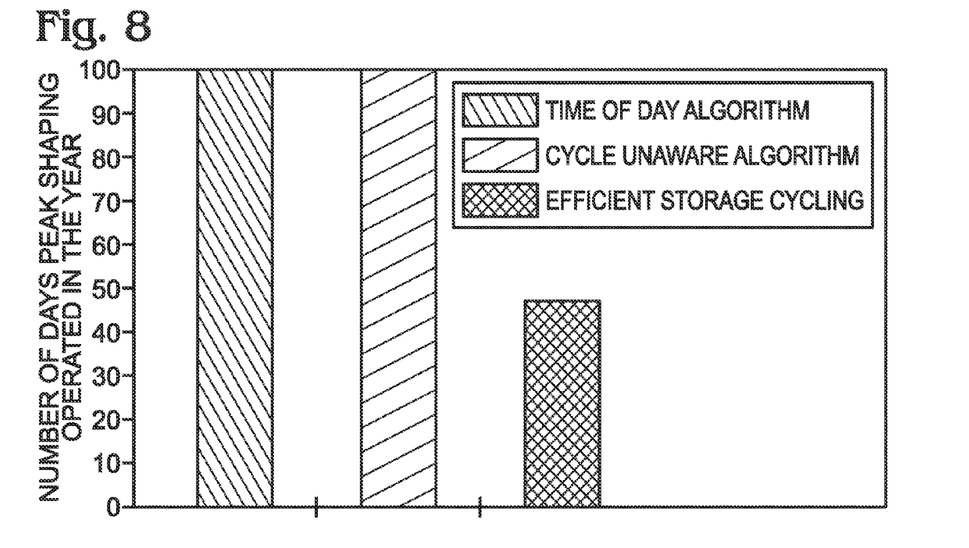
FIG. 8 is a chart comparing the efficiency of the storage management algorithms presented in FIG. 7.

FIG. 8 is a chart comparing the efficiency of the storage management algorithms presented in FIG. 7. The "cycle unaware" algorithm and "time-of-day" algorithms cycle the storage each day of the month. The disclosed storage cycling algorithm makes a decision to cycle or not cycle the storage each day. In the above example the cycle efficient algorithm cycles the storage on 46% of the days of the year.

Figure 9:
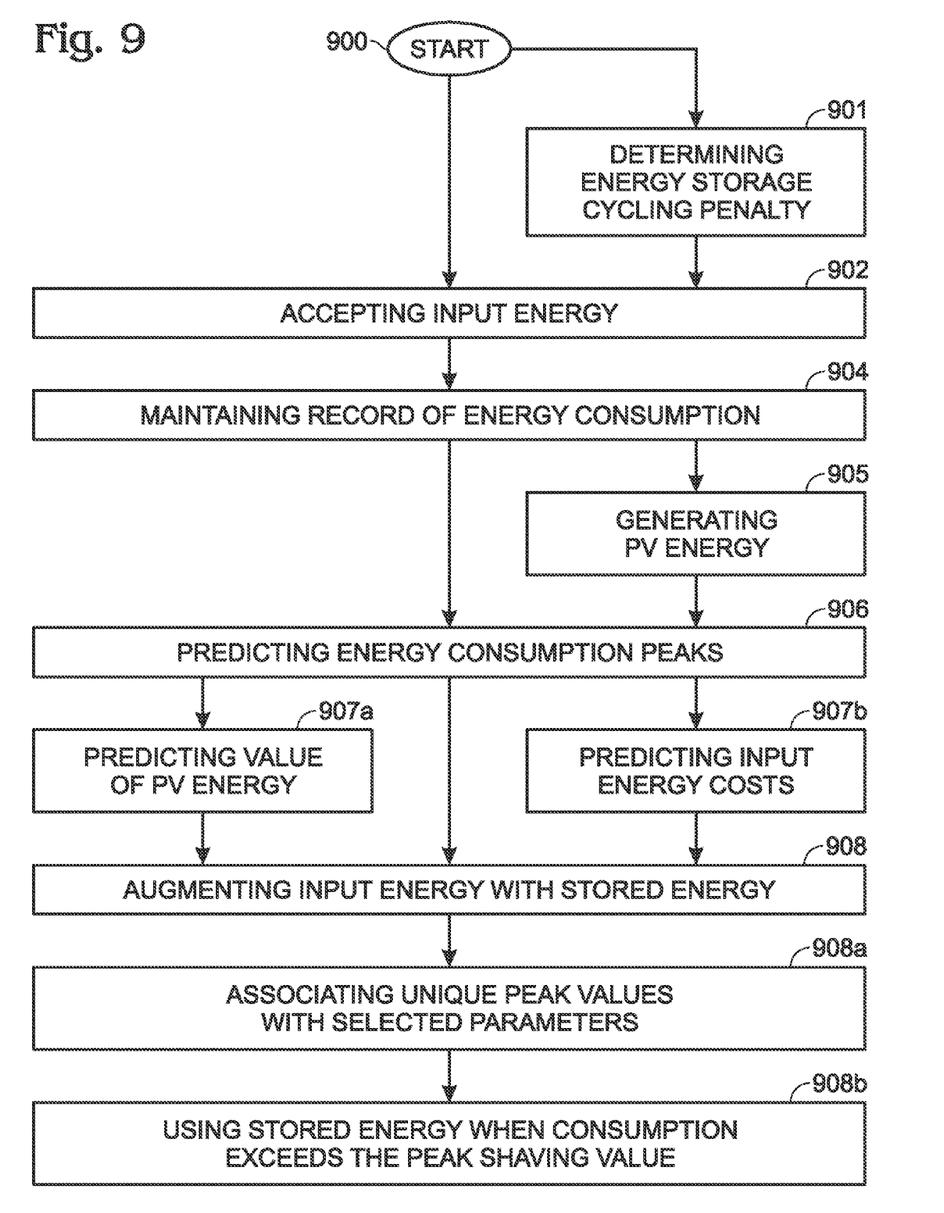
FIG. 9 is a flowchart illustrating a method for efficiently managing energy consumption using stored energy.

FIG. 9 is a flowchart illustrating a method for efficiently managing energy consumption using stored energy. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 900.

Step 902 accepts input energy. Step 904 maintains a record of energy consumption cross-referenced to parameters such as period of time, time of day, day of week, season, month, weather, current energy generation, previous energy generation, current consumption, weather predictions, input energy costs, input energy cost changes, previous peak shaving values, previous energy tier consumption, and combinations of the above-mentioned parameters. Step 906 predicts an energy consumption peak in response to analyzing the record of energy consumption. Step 908 augments input energy with stored energy during the predicted energy consumption peaks. In one aspect, Step 908 augments the input energy after a decision to used use stored energy either while stored energy is available, or in response to an analysis of a predicted value of the stored energy.

In one aspect, Step 908 includes substeps. Step 908a selects a peak shaving value based on a fraction of the predicted energy consumption peak. Step 908b uses the stored energy when energy consumption exceeds the peak shaving value. Predicting the energy consumption peak in Step 906 may include predicting an energy consumption peak associated with a selected parameter. Then, selecting the peak shaving value in Step 908a includes associating a unique peak shaving value with each selected parameter. For example, Step 906 may predict an energy consumption peak associated with a previous time of day.

In one aspect, Step 905 generates PV energy. Then, Step 907a predicts the value of the generated PV energy. Step 908 determines whether the generated PV energy should be added to the stored energy.

Typically, Step 902 accepts input energy having a cost associated with a factor such as the peak value of input energy accepted, a time of day, or total energy input. Then, Step 907b predicts input energy costs, and Step 908 augments input energy with stored energy in response to the input energy cost prediction.

In one aspect, Step 901 determines an energy storage equipment cycling penalty. Step 904 maintains the record of energy consumption by cross-referencing energy consumption to days in a billing period. Step 906 predicts a plurality of energy consumption peaks over the course of the billing period. Step 908a associates a unique peak shaving value with each energy consumption peak in the billing period, responsive to the determined energy storage equipment cycling penalty.

A system and method have been provided for efficiency managing energy consumption using stored energy. Examples of particular method steps presented to illustrate the invention. However, the invention is not limited to merely these examples. Other variations and embodiments of the invention will occur to those skilled in the art.

We claim:

1. A method for efficiently managing energy consumption using stored energy, the method comprising:
    accepting input energy;
    maintaining a record of energy consumption, including cross-referencing energy consumption to days in a billing period and cross-referencing energy consumption to parameters selected from a group consisting of a period of time, time of day, day of week, season, month, weather, current energy generation, previous energy generation, current consumption, weather predictions, input energy costs, input energy cost changes, previous peak shaving values, previous energy tier consumption, and combinations of the above-mentioned parameters;
    predicting an energy consumption peak associated with a selected parameter in response to analyzing the record of energy consumption, and predicting a plurality of energy consumption peaks over the course of the billing period;
    determining an energy storage equipment cycling penalty associated with energy storage equipment wear;
    augmenting input energy with stored energy during the predicted energy consumption peaks as follows:
        selecting a unique peak shaving value associated with each selected parameter, and associated with each energy consumption peak in the billing period in response to the determined energy storage equipment cycling penalty, and based on a fraction of the predicted energy consumption peak; and,
        using the stored energy when energy consumption exceeds the peak shaving value in response to an analysis of a predicted value of the stored energy.

2. The method of claim 1 further comprising:
    generating photovoltaic (PV) energy;
    predicting the value of the generated PV energy; and,
    wherein augmenting input energy with stored energy includes determining whether the generated PV energy should be added to the stored energy.

3. The method of claim 1 wherein accepting input energy includes accepting input energy having a cost associated with a factor selected from a group consisting of peak value of input energy accepted, a time of day, and total energy input;
    the method further comprising:
    predicting input energy costs; and,
    wherein augmenting input energy with stored energy includes augmenting input energy with stored energy in response to the input energy cost prediction.

4. The method of claim 1 wherein predicting the energy consumption peak includes predicting an energy consumption peak associated with a previous time of day.

5. A system for efficiently managing energy consumption using stored energy, the system comprising:
    an energy consumption unit having an interface to accept input energy and an interface to accept stored energy;
    an energy storage unit having an interface to selectively accept input energy and an interface to selectively supply stored energy to the energy consumption unit;
    a non-transitory memory;
    a processor;
    an energy consumption management application, enabled as a sequence of software instructions stored in memory and executed by the processor, the energy consumption management application having a user interface to accept selected parameters and maintaining a record of energy consumption by the energy consumption unit, predicting an energy consumption peak associated with selected parameters in response to analyzing the record of energy consumption, and commanding the energy storage unit to augment input energy to the energy consumption unit with stored energy during the predicted energy consumption peaks;
    wherein the energy consumption management application selects a unique peak shaving value associated with each selected parameter based on a fraction of the predicted energy consumption peak and commands the use the stored energy when energy consumption exceeds the peak shaving value in response to an analysis of a predicted value of the stored energy;
    wherein the energy consumption management application maintains the record of energy consumption by cross-referencing energy consumption to parameters selected from a group consisting of a period of time, time of day, current consumption, day of week, season, month, weather, weather predictions, input energy costs, input energy cost changes, previous energy tier consumption, current energy generation, previous energy generation, previous peak shaving values, and combinations of the above-mentioned parameters; and, wherein the energy consumption management application determines an energy storage unit equipment cycling penalty associated with energy storage unit equipment wear, maintains the record of energy consumption by cross-referencing energy consumption to days in a billing period, predicts a plurality of energy consumption peaks over the course of the billing period, and associates a unique peak shaving value with each energy consumption peak in the billing period, responsive to the determined energy storage unit equipment cycling penalty.

6. The system of claim 5 further comprising:
a photovoltaic (PV) energy generator; and, wherein the energy consumption management application predicts the value of the generated PV energy and determines whether the generated PV energy should be added to the stored energy or used by the energy consumption unit.

7. The system of claim 5 wherein the energy consumption unit and energy storage unit accept input energy having a cost associated with a factor selected from a group consisting of peak value of input energy accepted, a time of day, and total energy input; and, wherein the energy consumption management application predicts input energy costs and augments energy to the energy consumption unit with stored energy in response to the input energy cost prediction.

8. The system of claim 5 wherein the energy consumption management application predicts an energy consumption peak associated with a previous time of day.

\* \* \* \* \*